(12) United States Patent
Tsai et al.

(10) Patent No.: US 12,467,615 B2
(45) Date of Patent: Nov. 11, 2025

(54) VEHICLE REAR SEAT DISPLAY WITH MULTIFUNCTIONAL EYE PROTECTION LIGHT

(71) Applicant: Jet Optoelectronics Co., Ltd., Taipei (TW)

(72) Inventors: Ke-Yu Tsai, New Taipei (TW); Sheng-Yueh Lin, Taipei (TW)

(73) Assignee: Jet Optoelectronics Co., Ltd., Taipei (TW)

( * ) Notice: Subject to any disclaimer, the term of this patent is extended or adjusted under 35 U.S.C. 154(b) by 0 days.

(21) Appl. No.: 18/766,093

(22) Filed: Aug. 6, 2024

(65) Prior Publication Data
US 2025/0075892 A1  Mar. 6, 2025

(30) Foreign Application Priority Data
Sep. 6, 2023 (TW) ................ 112133940

(51) Int. Cl.
*F21V 21/30* (2006.01)
*B60Q 3/233* (2017.01)
*B60Q 3/70* (2017.01)
*B60Q 3/76* (2017.01)

(52) U.S. Cl.
CPC .............. *F21V 21/30* (2013.01); *B60Q 3/233* (2017.02); *B60Q 3/70* (2017.02); *B60Q 3/76* (2017.02)

(58) Field of Classification Search
CPC . B60Q 3/233; B60Q 3/76; B60Q 3/57; B60Q 3/44; B60Q 3/56; F21V 21/30; F21V 33/0052
See application file for complete search history.

(56) References Cited

U.S. PATENT DOCUMENTS

| 2008/0031001 | A1* | 2/2008 | Sun | F21S 8/00 |
| | | | | 362/427 |
| 2016/0257247 | A1* | 9/2016 | Munday | B60Q 3/44 |
| 2022/0003405 | A1* | 1/2022 | Hsieh | H05B 47/105 |

FOREIGN PATENT DOCUMENTS

| TW | I482142 B | 4/2015 | |
| WO | WO-2004067320 A1 * | 8/2004 | B60Q 3/233 |

OTHER PUBLICATIONS

Machine translation of WO 2004067320 to Mertens, published Aug. 12, 2004 (Year: 2004).*
Office Action of corresponding TW application 112133940.

* cited by examiner

*Primary Examiner* — William N Harris
(74) *Attorney, Agent, or Firm* — Wang Law Firm, Inc.

(57) ABSTRACT

A vehicle rear seat display with a multifunctional eye protection light is provided, and the vehicle rear seat display with a multifunctional eye protection light includes a display, a multifunctional eye protection light, and a connecting piece. The multifunctional eye protection light is retractably disposed on the back of the display through the connecting piece, and the multifunctional eye protection light is also rotated vertically along the connecting piece to adjust the light-illuminating angle according to the user's usage situation.

8 Claims, 6 Drawing Sheets

VEHICLE REAR SEAT DISPLAY WITH MULTIFUNCTIONAL EYE PROTECTION LIGHT

CROSS-REFERENCE TO RELATED APPLICATION

This application claims priority from Taiwan Patent Application No. 112133940, filed on Sep. 6, 2023, in the Taiwan Intellectual Property Office, the content of which is hereby incorporated by reference in its entirety for all purposes.

BACKGROUND OF THE INVENTION

1. Field of the Invention

The present disclosure relates to a vehicle rear seat display with an eye protection light, in particular to a vehicle rear seat display with a multifunctional eye protection light that allows adjusting the light-illuminating angle according to the usage situation of the rear seat user.

2. Description of the Related Art

With the advancement of technology and the demand of human beings for audio-visual entertainment, all kinds of display-related audio-visual equipment have been widely used in homes, companies, public places, medium and large-sized vehicles, airplanes, cruise ships, etc. During the commute to work or long-distance travel, to pass a long period of boredom on the transportation system, there already have been entertainment devices to entertain passengers, such as stereos or displays. These devices are provided for passengers to listen to music or watch movies, etc., in order to pass the time when taking the transportation.

However, for a display disposed at the rear seat of a vehicle, due to the lack of ambient light at night, there is a strong contrast between the display screen and the ambient light, resulting in eye discomfort caused by long-term viewing. Although auxiliary illumination is provided by rear seat lights, the amount of light source is still slightly insufficient. Moreover, as rear seat lights are usually disposed on the roof of the vehicle, the angle of illumination of the light source is fixed and cannot be adjusted, which may also cause glare on the display and affect the viewing experience of rear seat users.

On the other hand, in addition to watching videos on the rear seat display, passengers may also read books or documents at rear seats. If passengers are women who need to apply or reapply makeup during their commute to work, they need sufficient light for reading or applying makeup.

In summary, there is a need to develop a vehicle rear seat display with a multifunctional eye protection light to solve the aforementioned problems.

SUMMARY OF THE INVENTION

In view of the aforementioned conventional problems, the present disclosure provides a vehicle rear seat display with a multifunctional eye protection light that allows adjusting the light-illuminating angle correspondingly according to the usage situation of the rear seat user.

To achieve the above purposes, the present disclosure provides a vehicle rear seat display with a multifunctional eye protection light, including a display, a multifunctional eye protection light, and a connecting piece, wherein the connecting piece is coupled between the display and the multifunctional eye protection light, and a plurality of hinge mechanisms are disposed inside the connecting piece. Specifically, the connecting piece is slidably disposed with respect to the display such that the multifunctional eye protection light is retractably disposed at the upper end of the back of the display along with the connecting piece, and the multifunctional eye protection light is coupled to the connecting piece through the plurality of hinge mechanisms, and thus is able to be rotated toward a front of the display, and is also able to be rotated vertically along the connecting piece.

The display includes an accommodating space and a bracket fixture, and the accommodating space is disposed at the upper end of the back of the display, which is used to retract the connecting piece and the multifunctional eye protection light; the bracket fixture is disposed at the center of the back of the display, which is used to fix the display on the back of the front seat.

Preferably, a lower end of the accommodating space may be further disposed with any conventional pressing structure to retract the connecting piece and the multifunctional eye protection light therein. When attempting to take out the multifunctional eye protection light, press the multifunctional eye protection light, which may be ejected from the accommodating space together with the connecting piece for easy removal and use; when attempting to retract the multifunctional eye protection light into the accommodating space after use, press the multifunctional eye protection light, which may be retracted into the accommodating space together with the connecting piece and fixed therein.

The multifunctional eye protection light includes a light strip and is connected to the connecting piece through a hinge mechanism, in such a way that the multifunctional eye protection light may be rotated vertically along the connecting piece toward the front of the display; the light-illuminating angle may be controlled and adjusted correspondingly according to the usage situation of the rear seat user.

Preferably, the multifunctional eye protection light may be used in the following three modes according to the angle of rotation:

1. Makeup light mode: When the multifunctional eye protection light is parallel to the screen of the display (at an angle of 0°), it is defined as a makeup light mode, which allows the light to be focused on the face of the rear seat user for applying or reapplying makeup.

Preferably, a camera may be further disposed on the front of the display or the multifunctional eye protection light. The rear seat user may directly look at the screen of the display to apply or reapply makeup. There is no need to hold a mirror with one hand and apply makeup with the other hand, improving makeup efficiency.

2. Reading light mode: When the angle between the multifunctional eye protection light and the screen of the display is greater than 0° and less than 90°, it is defined as the reading light mode, which may allow adjusting the appropriate angle according to the seating position of the rear seat user, in order to focus the light on the book or document to facilitate reading.

3. Eye protection light mode: When the multifunctional eye protection light is perpendicular to the screen of the display (at an angle of 90°), it is defined as the eye protection light mode, which may make the light illuminated downwards, in order to neutralize the light emitted by the screen of the display directly towards the rear seat user, thus reducing eye fatigue and discomfort for the rear seat user from direct light to eyes.

The technical features of the present disclosure are to be illustrated in detail below with specific embodiments and accompanying drawings to make a person with ordinary skill in the art effortlessly understand the purposes, technical features, and advantages of the present disclosure.

BRIEF DESCRIPTION OF THE DRAWINGS

The exemplary embodiments of the present disclosure are to be more fully understood from the following detailed description and the accompanying drawings of various embodiments of the present disclosure, which, however, should not be regarded as limiting the present disclosure to particular embodiments, but are only used for illustrative and understanding purposes only.

DESCRIPTION OF THE PREFERRED EMBODIMENTS

Figure 1:
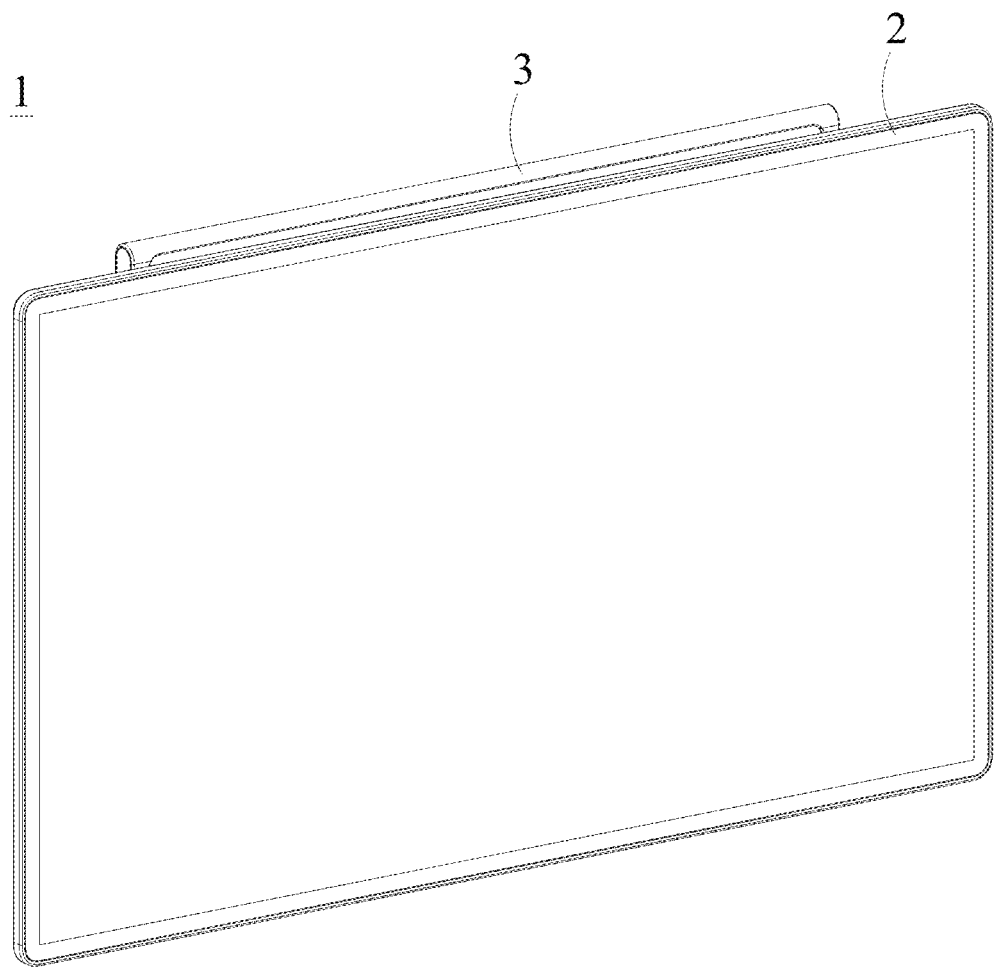
FIG. 1 is a schematic diagram of the vehicle rear seat display with a multifunctional eye protection light according to the present disclosure.
Figure 2:
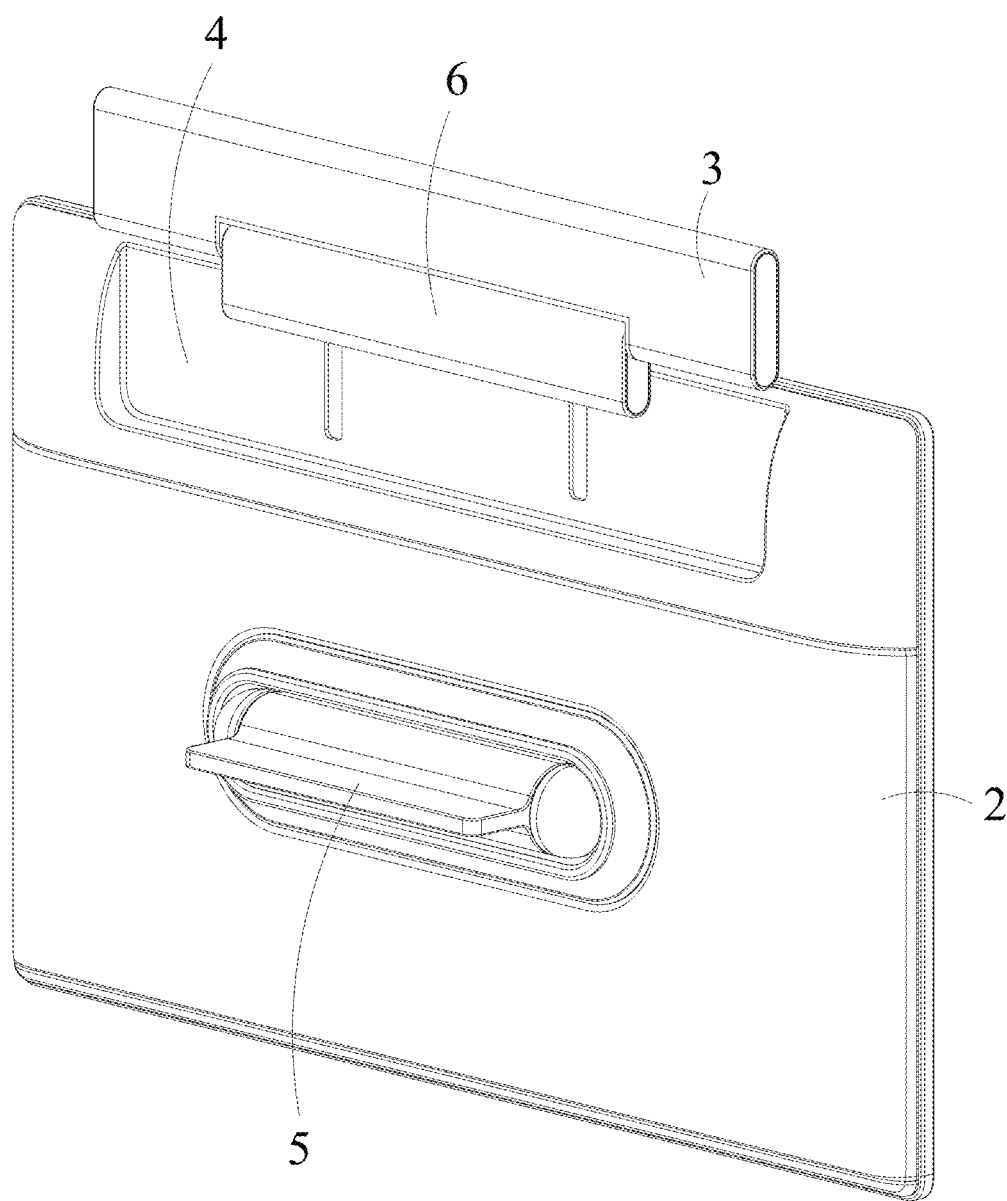
FIG. 2 is a rear diagram of the vehicle rear seat display with a multifunctional eye protection light according to the present disclosure.

To make the features, contents, and advantages as well as the effects achieved by the present disclosure clearly expressed, the present disclosure is to be described in detail in conjunction with the form of the accompanying drawings. In addition, the drawings herein are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

To make a more complete and clearer disclosure of the technical contents, the purpose of the present disclosure, and the effects achieved by the present disclosure, they are described in detail below. Please refer to the disclosed drawings and drawing numbers together.

Please refer to FIG. 1 to FIG. 4, which are a schematic diagram, a rear diagram, a front diagram, and a schematic diagram of the connecting piece of the vehicle rear seat display with a multifunctional eye protection light according to the present disclosure in sequence.

The vehicle rear seat display with a multifunctional eye protection light 1 includes a display 2, a multifunctional eye protection light 3, and a connecting piece 6. The connecting piece 6 is coupled between the display 2 and the multifunctional eye protection light 3, and a plurality of hinge mechanisms 8 are disposed inside the connecting piece 6.

Specifically, the connecting piece 6 is slidably disposed with respect to the display 2 such that the multifunctional eye protection light 3 is retractably disposed at the upper end of the back of the display 2 along with the connecting piece 6, and the multifunctional eye protection light 3 is coupled to the connecting piece 6 with the plurality of hinge mechanisms 8 (see FIG. 4) and thus able to be rotatable toward a front of the display 2.

The display 2 includes an accommodating space 4 and a bracket fixture 5, and the accommodating space 4 is disposed at the upper end of the back of the display 2, which is used to retract the connecting piece 6 and the multifunctional eye protection light 3; the bracket fixture 5 is disposed at the center of the back of the display 2, which is used to fix the display 2 on the back of the front seat.

Figure 5:
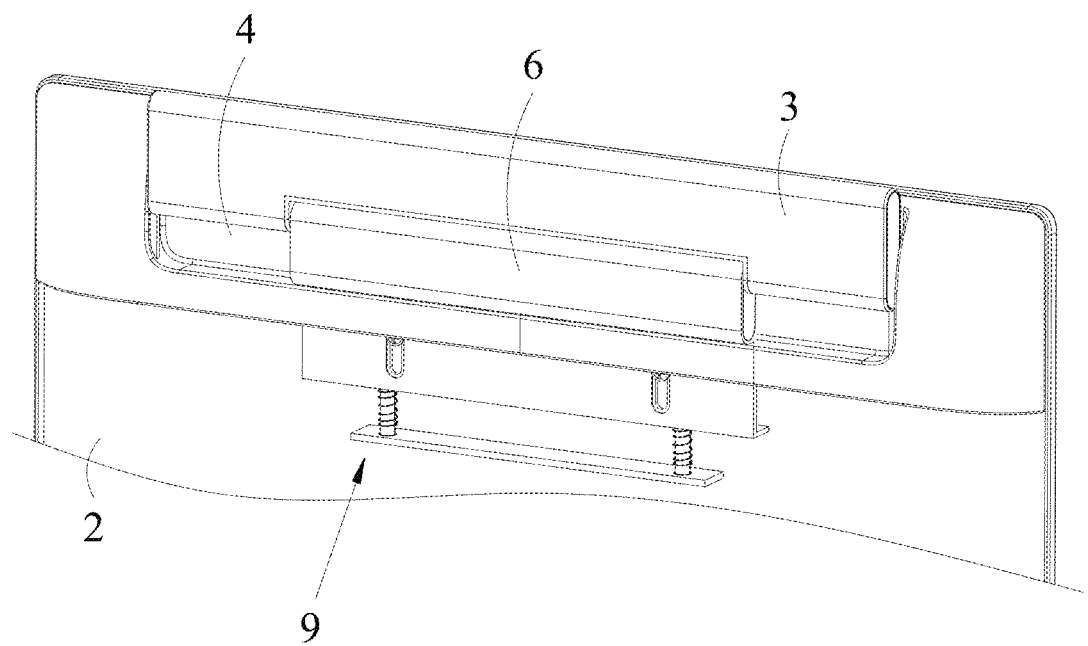
FIG. 5 is a schematic diagram of the pressing structure disposed at the lower end of the accommodating space in the vehicle rear seat display with a multifunctional eye protection light according to the present disclosure.

Preferably, please also refer to FIG. 5, the lower end of the accommodating space 4 may be further disposed with a pressing structure 9, which may be any conventional pressing structure, to retract the connecting piece 6 and the multifunctional eye protection light 3 therein. When attempting to take out the multifunctional eye protection light 3, press the multifunctional eye protection light 3, which may be ejected from the accommodating space 4 together with the connecting piece 6 for easy deployment and use; when attempting to retract the multifunctional eye protection light 3 into the accommodating space 4 after use, press the multifunctional eye protection light 3, which may be retracted into the accommodating space 4 together with the connecting piece 6 and fixed therein.

The multifunctional eye protection light 3 includes a light strip 7 and is connected to the connecting piece 6 through a hinge mechanism, in such a way that the multifunctional eye protection light 3 may be rotated vertically along the connecting piece 6 toward the front of the display 2; the light-illuminating angle may be controlled and adjusted correspondingly according to the usage situation of the rear seat user.

Figure 6:
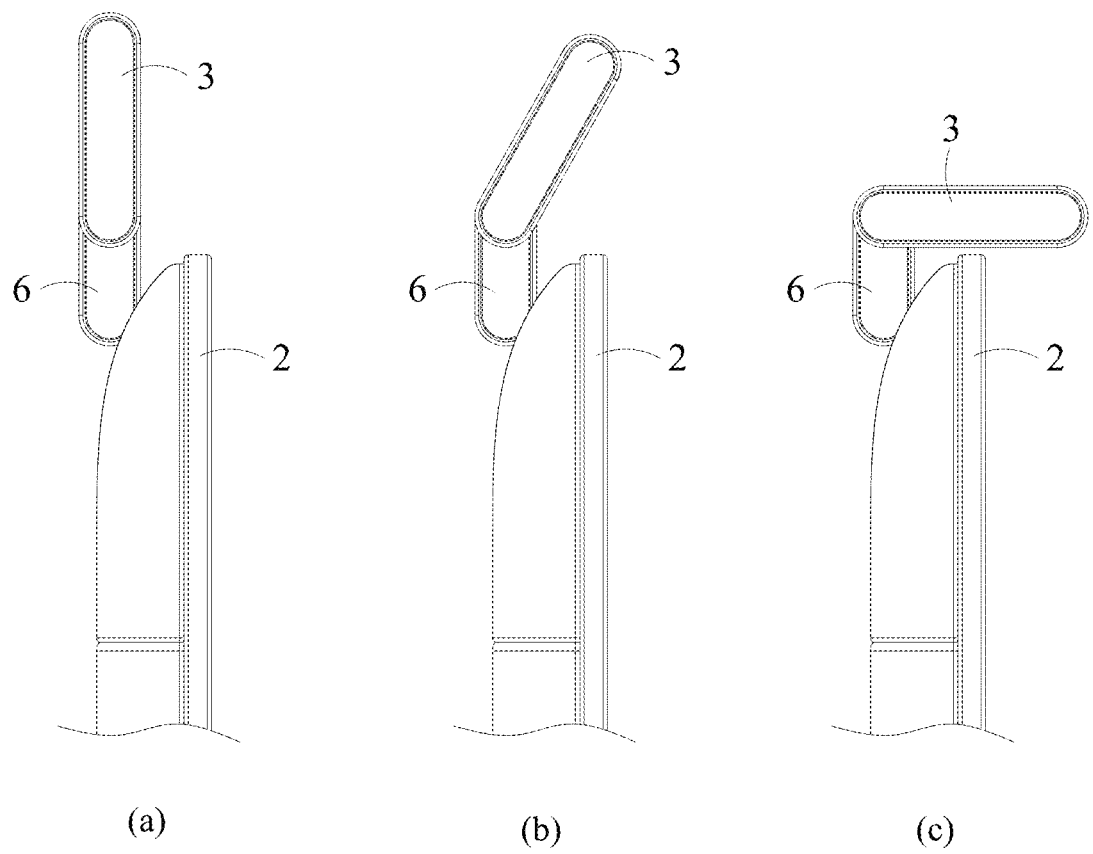
FIG. 6 is a schematic diagram showing the different modes of use of the multifunctional eye protection light in the vehicle rear seat display with a multifunctional eye protection light according to the present disclosure.

Please also refer to FIG. 6, which is a schematic diagram showing the different modes of use of the multifunctional eye protection light in the vehicle rear seat display with a multifunctional eye protection light according to the present disclosure; preferably, the multifunctional eye protection light 3 may be used in the following three modes according to the angle of rotation:

1. Makeup light mode: When the multifunctional eye protection light 3 is parallel to the screen of the display 2 (at an angle of 0°), as illustrated in part (a) of FIG. 6 for example, it is defined as a makeup light mode, which allows the light to be focused on the face of the rear seat user for applying or reapplying makeup.

Figure 3:
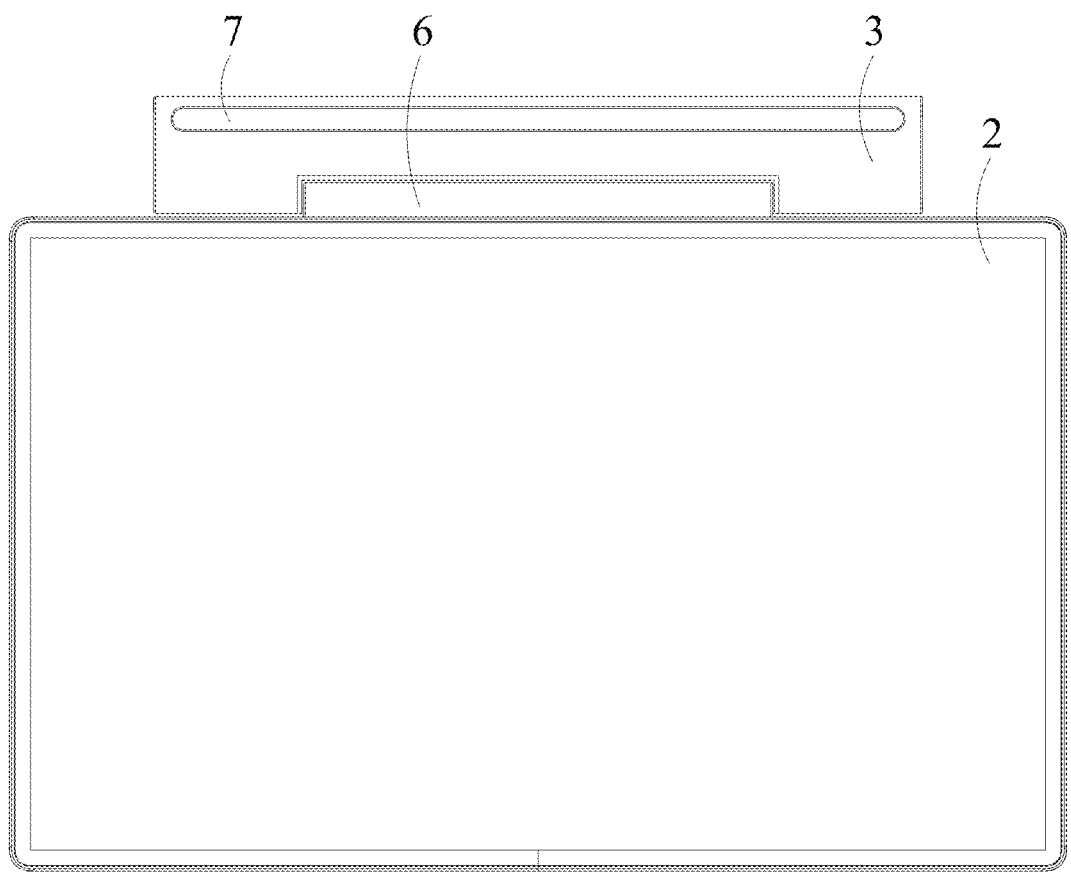
FIG. 3 is a front diagram of the vehicle rear seat display with a multifunctional eye protection light according to the present disclosure.
Figure 4:
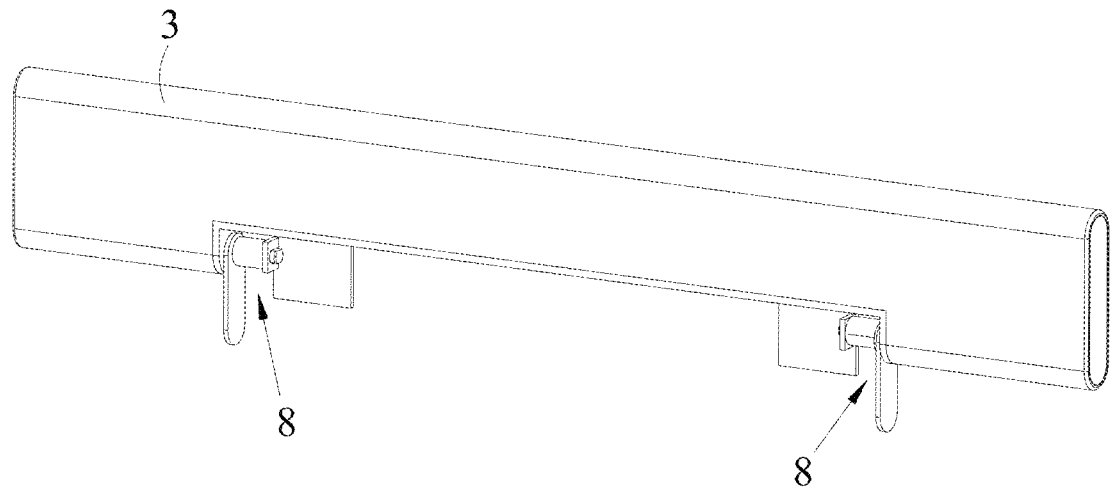
FIG. 4 is a schematic diagram of the connecting piece in the vehicle rear seat display with a multifunctional eye protection light according to the present disclosure.
Figure 7:
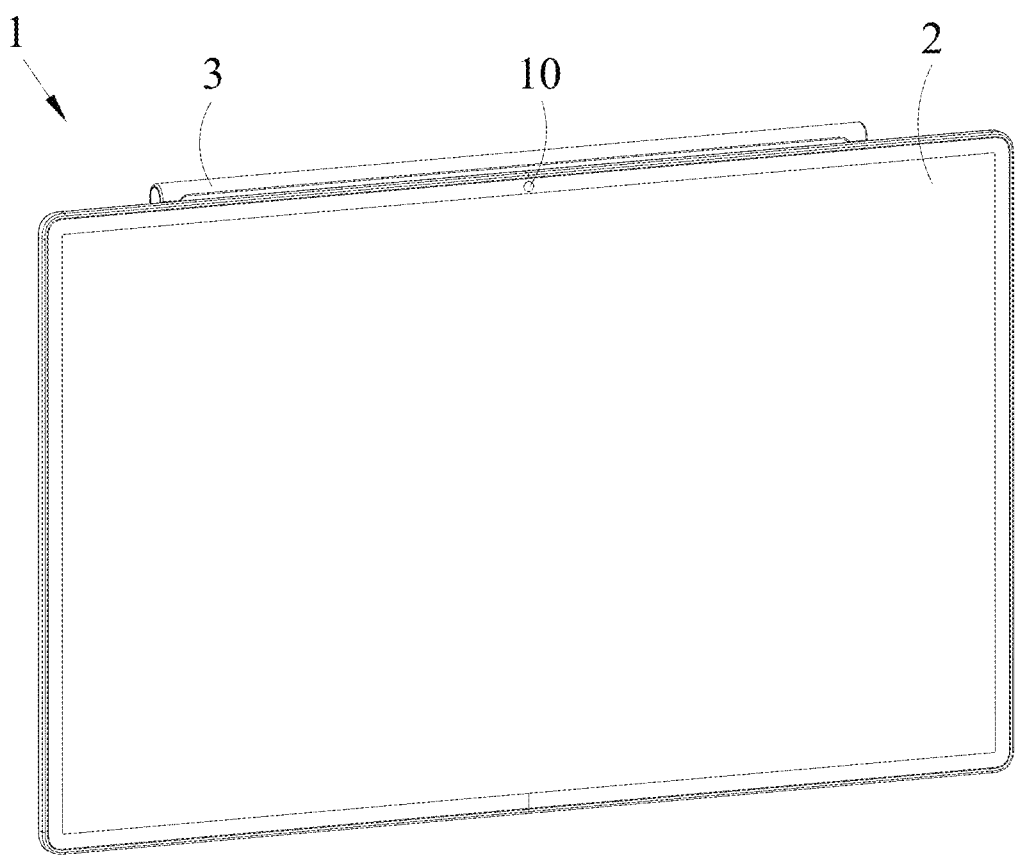
FIG. 7 is a schematic diagram of the camera disposed at the front of the display in the vehicle rear seat display with a multifunctional eye protection light according to the present disclosure.

Preferably, please also refer to FIG. 7, a camera 10 may be further disposed on the front of the display 2 (see FIG. 1) or the multifunctional eye protection light (see FIG. 3). The rear seat user may directly look at the screen of the display 2 to apply or reapply makeup. There is no need to hold a mirror with one hand and apply makeup with the other hand, improving makeup efficiency.

2. Reading light mode: When the angle between the multifunctional eye protection light 3 and the screen of the display 2 is greater than 0° and less than 90°, as illustrated in part (b) of FIG. 6 for example, it is defined as the reading light mode, which may allow adjusting the appropriate angle according to the seating position of the rear seat user, in order to focus the light on the book or document to facilitate reading.

3. Eye protection light mode: When the multifunctional eye protection light 3 is perpendicular to the screen of the display 2 (at an angle of 90°), as illustrated in part (c) of FIG. 6 for example, it is defined as the eye protection light mode, which may make the light illuminated downwards, in order to neutralize the light emitted by the screen of the display 2 directly towards the rear seat user, thus reducing eye fatigue and discomfort for the rear seat user from direct light to eyes.

In summary, through the vehicle rear seat display with a multifunctional eye protection light provided by the present disclosure, in addition to solving the problem of tiredness in the eyes of a rear seat user due to insufficient light when watching videos, the user may also adapt to a variety of different usage situations to achieve multifunctional effects by adjusting the light-illuminating angle of the eye protection light.

The embodiments of the present disclosure covered by the patent application are defined by the present claims, not by the summary of the invention. The summary of the invention is a high-level generalization of the various aspects of the present disclosure and introduces some concepts further described in the following detailed description. The summary of the invention is not intended to identify the essential or necessary features of the claimed subject matter, nor is it intended to be used solely to define the claimed subject matter. The subject matter should be understood by reference to the entire specification, any or all of the drawings, and the appropriate portion of every claim of the present disclosure.

What is claimed is:

1. A vehicle rear seat display with a multifunctional eye protection light, comprising:
   a display, comprising an accommodating space and a bracket fixture, the accommodating space being disposed at an upper end of a back of the display, and the bracket fixture being disposed at a center of the back of the display;
   a multifunctional eye protection light, comprising a light strip; and
   a connecting piece is disposed between the display and the multifunctional eye protection light, and a plurality of hinge mechanisms are disposed inside the connecting piece, wherein
   the connecting piece is slidably disposed with respect to the display such that the multifunctional eye protection light is retractably disposed in the accommodating space; and
   the multifunctional eye protection light is coupled to the connecting piece with the plurality of hinge mechanisms and able to be rotatable toward a front of the display.

2. The vehicle rear seat display with a multifunctional eye protection light according to claim 1, wherein a lower end of the accommodating space has a pressing structure.

3. The vehicle rear seat display with a multifunctional eye protection light according to claim 2, wherein the connecting piece and the multifunctional eye protection light are taken out of or retracted back to the accommodating space through the pressing structure.

4. The vehicle rear seat display with a multifunctional eye protection light according to claim 1, wherein a camera is further disposed on a front of the display or the multifunctional eye protection light.

5. The vehicle rear seat display with a multifunctional eye protection light according to claim 1, wherein the multifunctional eye protection light has a makeup light mode, a reading light mode, and an eye protection light mode according to different rotation angles.

6. The vehicle rear seat display with a multifunctional eye protection light according to claim 5, wherein for the makeup light mode, the multifunctional eye protection light is rotated to be parallel to a screen of the display, thus focusing light on a rear seat user's face, in order to allow the rear seat user to apply or reapply makeup.

7. The vehicle rear seat display with a multifunctional eye protection light according to claim 5, wherein for the reading light mode, the multifunctional eye protection light is rotated to an angle between 0° and 90° with a screen of the display, in order to focus light on a book or document to facilitate reading.

8. The vehicle rear seat display with a multifunctional eye protection light according to claim 5, wherein for the multifunctional eye protection light mode, the multifunctional eye protection light is rotated to be perpendicular to a screen of the display, in order to make light illuminated downwards to neutralize light emitted by a screen of the display directly towards a rear seat user, thus reducing eye fatigue and discomfort for the rear seat user from direct light to eyes.

* * * * *